United States Patent Office 2,930,025
Patented Mar. 22, 1960

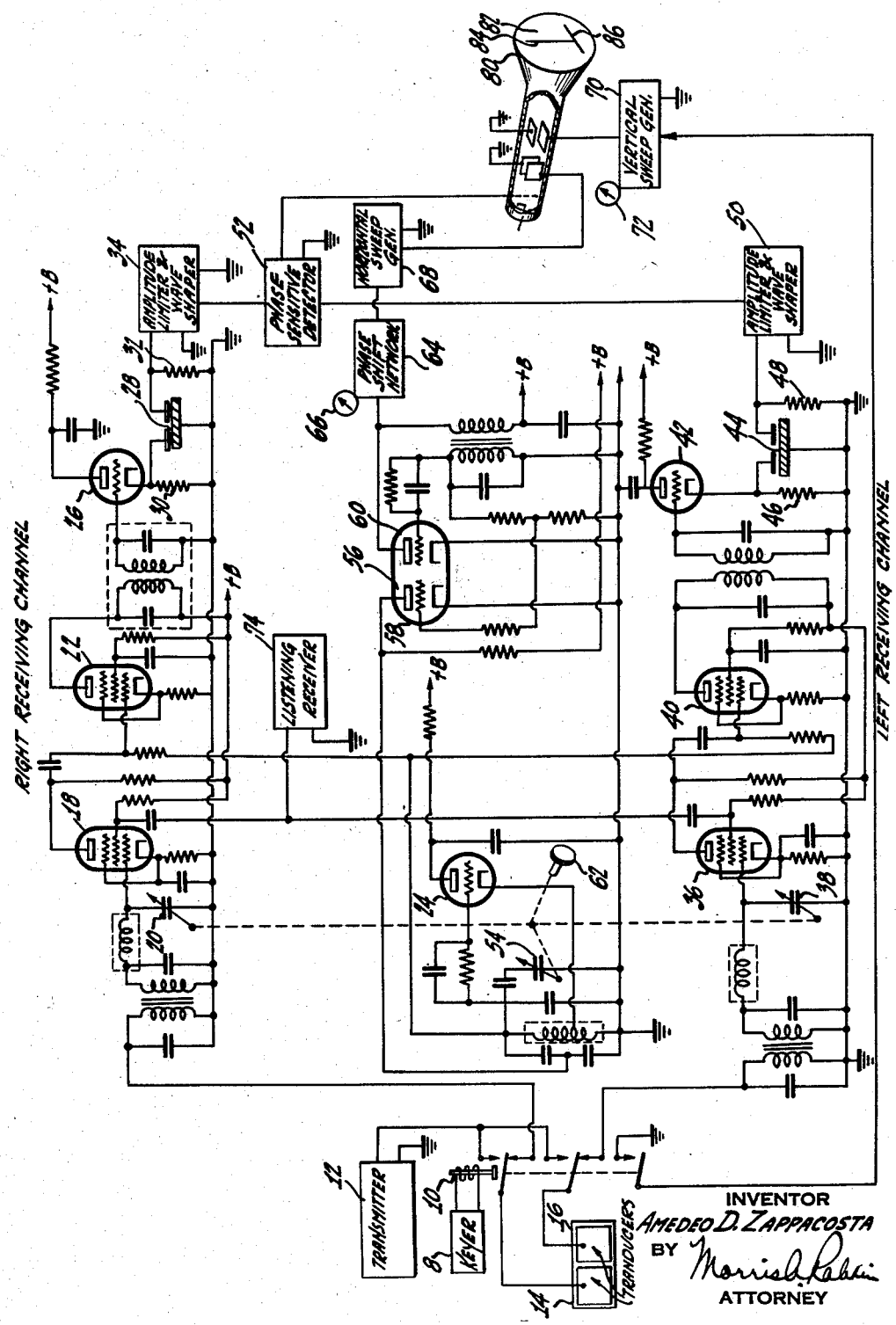

2,930,025

DUAL CHANNEL SUPERHETERODYNE RECEIVER

Amedeo D. Zappacosta, Havertown, Pa., assignor, by mesne assignments, to the United States of America as represented by the Secretary of the Navy Application March 31, 1949, Serial No. 84,708

3 Claims. (Cl. 340—3)

This invention relates to object locating and detection systems, and more particularly to a dual channel receiving system in a submarine pulse-echo object detecting and locating system.

In my copending application for "Dual Channel Superheterodyne Receiver," application Ser. No. 84,707, filed March 31, 1949, is disclosed and claimed a submarine pulse-echo object locating system wherein the azimuth of an object is determined by detecting the difference in phase between the signals generated by two coplanar transducers in response to a compressional wave signal received from the object being detected, and comparing this phase difference with a reference phase frequency representing the mechanical neutral or plane of zero azimuth. When the object being detected is in the plane at right angles to and bisecting the line between the two coplanar receivers, the path length of the compressional wave signal from the object to each of the receivers is equal, and no difference in phase exists between the electrical signals generated by each of the transducers in response to the compressional wave signal. When the object is not in the plane of zero azimuth then one of the transducers will be nearer to the object than the other and will consequently be activated by the compressional wave signal sooner than the other. The electrical signals generated by the transducers will accordingly be out of phase by the time delay in their respective activation which in turn is dependent upon the location of the object with respect to the zero azimuth plane.

In the operation of a submarine object detecting and locating system it has been found that in order to properly detect the various types of craft, the system must cover a wide range of supersonic frequencies. Therefore, for the detection of azimuth not only must the system be tunable over a frequency range, but it must be able to isolate and preserve the relative phase of the signals generated by the transducers until the phase difference is detected. The system must also provide a stable reference phase frequency which is referred to the plane of zero azimuth and with which the phase difference is compared and the resultant utilized for azimuth detection purposes. One system for accomplishing this result is shown in my copending application for "Dual Channel Superheterodyne Receiver," application Ser. No. 84,707, filed March 31, 1949, wherein a tunable dual channel superheterodyne system utilizes a fixed crystal local oscillator in each channel and derives a reference phase frequency from the two crystal oscillators. The instant invention eliminates the necessity for a fixed crystal local oscillator in each channel.

It is therefore an object of this invention to provide a submarine object detecting and locating system having variable tuning, isolating, receiving and wave translating channels.

It is a further object of this invention to provide a submarine object detecting and locating system having variable tuning, isolating, receiving and wave translating channels and a stable reference phase frequency.

It is still a further object of my invention to provide a submarine object detecting and locating system having variable tuning, isolating, receiving and wave translating channels in which the relative difference in phase of the wave inputs to the channel is preserved.

It is also an object of my invention to provide a submarine object detecting and locating system wherein an electrical zero phase point referred to a mechanical center is maintained in stable relationship.

These objects are achieved in accordance with this invention by a separate superheterodyne receiver for each transducer and utilizing a frequency modulated oscillator to supply local oscillations to both receivers and utilizing the modulating oscillations as the reference phase frequency.

Other objects and advantages of the invention will be apparent during the course of the following description. The invention itself, however, as to both its organization and method of operation will best be understood by reference to the following description taken in connection with the drawing in which I have indicated a submarine pulse-echo object detecting and locating system diagrammatically, with the variable tuning, dual channel, receiving and wave translating system and its converter oscillator being shown therein schematically.

Referring now to the drawing a keyer 8 closes a normally open keyer relay 10 which couples the transmitter 12 simultaneously to two transducers 14 and 16, while respectively decoupling the right receiving channel and the left receiving channel from the transducers 14 and 16 with which they are associated. The transmitter 12 is variable and can generate signal pulses from 19 kc. to 27 kc. The transducers 14 and 16 convert a supersonic pulse of electrical energy supplied by the transmitter 12, into compressional wave energy and simultaneously project this pulse of compressional wave energy. Transducers 14 and 16 are aligned in the same plane and are separated by a known distance. It is customary to place both transducers side by side and slightly separated in the same outer receptacle.

The pulse projected by the transducers strikes an object which either reflects the energy or reradiates energy in response thereto which travels back to the transducers 14 and 16. Keyer 8 meanwhile releases keyer relay 10 which disconnects the transmitter 12 from the transducers and connects the right receiving channel to transducer 14, and the left receiving channel to transducer 16. Transducers 14 and 16 convert the compressional wave energy received into electrical energy. If the object returning the compressional wave signal is in a plane which bisects and is perpendicular to the line between the two transducers, then the transducers will be simultaneously energized, since the distance traveled by the compressional wave energy to each of the transducers is the same. No phase difference will exist in the resultant electrical energy generated by transducers 14 and 16 in response to the compressional wave energy. If the object returning the compressional wave signal is not in the plane which bisects and is perpendicular to the line between the two coplanar transducers, then the distance that the compressional wave energy travels to each of the transducers is not the same. Either transducer 14 or transducer 16 will receive the reflected compressional wave signal first, depending upon which one of the transducers is the nearer to the object. The difference in phase between the electrical signals generated by the transducers is therefore directly dependent upon the location of the object with respect to the plane which bisects and is perpendicular to the line between the two coplanar transducers. Since the speed of compressional wave energy at supersonic frequencies is relatively slow in water, being approximately 4800 feet per second, it is possible to place the transducers 14 and 16 fairly close together and still get a phase difference capable of being detected for echoes from objects which are to the right or left of the plane of the mechanical neutral, or the plane at right angles to and bisecting the line between the transducers 14 and 16.

The transducers 14 and 16 are respectively associated with a right receiving channel and a left receiving channel. The right receiving channel has a stage of radio frequency amplification to which the electrical output of transducer 14 is coupled. This radio frequency stage includes a multi-grid tube 18 having a tuned grid circuit including a variable condenser 20 by means of which it is tuned over the frequency range of 19 to 27 kc. The output from the radio frequency amplifier tube 18 is impressed on a mixer stage. The mixer stage consists of a multigrid tube 22 upon the input of which is impressed not only the output form radio frequency amplifier tube 18, but also part of the output from the frequency modulated oscillator tube 24. The output from mixer tube 22 is then impressed upon an intermediate frequency stage. This intermediate frequency stage consists of a triode tube 26 having its grid circuit tuned to 60.000 kc. and its cathode circuit coupled to a crystal 28. The crystal is so selected and connected in circuit as to have a series resonance at 60.000 kc. Cathode bias resistor 30 and output resistor 32 are both selected to match the series resonance impedance of the crystal 28. The result is that the intermediate frequency amplifier tube 26 has an output of 60.000 kc. with an extremely high rejection of frequencies on either side.

The output from the intermediate frequency amplifier tube 26 is impressed upon an amplitude limiter and wave shaper network 34 which limits the maximum amplitude of the received wave, shapes it into a more rectangular form and then differentiates it.

The left receiving channel includes a tunable radio frequency amplification stage to which is coupled the electrical output from transducer 16. This stage consists of multigrid tube 36 with a tuned grid circuit including variable condenser 38 by means of which it is tunable over the frequency range of 19 kc. to 27 kc. The output of radio frequency amplifier tube 36 is impressed upon a mixer stage consisting of multigrid tube 40. Also impressed upon mixer tube 40 is another part of the output from the frequency modulated oscillator tube 24. The output from mixer tube 40 is then coupled to an intermediate frequency stage consisting of a triode tube 42 having its grid circuit tuned to 60.400 kc. and its cathode circuit coupled to a crystal 44. The crystal 44 is so selected and connected in the circuit as to have a series resonance at 60.400 kc. Cathode bias resistor 46 and output resistor 48 are both selected to match the series resonance impedance of the crystal 44. The results is that intermediate frequency amplifier tube 42 has an output of 60.400 kc. with an extremely high rejection of frequencies on either side.

The output from intermediate frequency amplifier tube 42 is then impressed upon amplitude limiter and wave shaper network 50 which limits the maximum amplitude of the receiver wave, shapes it into a more rectangular form and then differentiates it.

The output from amplitude limiters and wave shapers 34 and 50 are impressed upon a phase sensitive detector 52 in which they are combined and their phase difference detected. The output from phase sensitive detector 52 is a 400 cycle pulse whose occurrence is determined not only by the time it takes for the compressional waves to travel between both transducers 14 and 16 and the object being detected, but whose occurrence within the time duration of a reference 400 cycle wave is determined by the phase difference between the electrical waves generated by each transducer. The output from the phase sensitive detector 52 is impressed upon the intensity grid of the cathode ray oscilloscope tube 80.

The common converter oscillator for both left and right receiving channels and source of 400 cycle reference phase supply consists of a frequency modulated oscillator tube 24 having a center carrier frequency which can be continuously varied from 79 kc. to 87 kc. by means of variable condenser 54. Vacuum tube 56 is a dual triode in which one half of the dual triode section 58 serves as the variable impedance tube for the frequency modulated oscillator tube 24, and the other half dual triode section 60 is a 400 cycle oscillator, a portion of whose output is impressed on the variable impedance half dual triode 58 to modulate the frequency of the center carrier generated by the frequency modulated oscillator tube 24. The constants of the frequency modulated system are selected so that the deviation of the frequency of the center carrier is plus or minus 400 cycles for the 400 cycle modulating frequency. A detailed explanation of this narrow band frequency modulating system will be found in Patent No. 2,461,364, issued February 8, 1949, to Amedeo D. Zappacosta.

By any commonly known mechanical means such as ganging, the variable condensers 20, 38 and 54, as shown by the dotted lines in the drawing, are simultaneously tuned with control 62 so that as the radio frequency amplifier tubes 18 and 36 are tuned from 19 kc. through 27 kc., the center carrier frequency of the frequency modulated oscillator 24 is varied from 79 kc. through 87 kc.

Another portion of the output of the 400 cycle oscillator half dual triode 60 is impressed upon the phase shift network 64. Phase shift network 64 is made variable to give any desired phase shift to the 400 cycles impressed upon it, being varied by means of the phase shift control 66. The output from the phase shift network 64 is impressed upon horizontal sweep generator 68 wherein it synchronizes the generation of a 400 cycle horizontal sweep voltage having a sweep commencement time which is dependent upon the phase of the 400 cycle voltage output from the phase shift network 64. The output from the 400 cycle sweep generator 68 is impressed upon the horizontal deflection plates of cathode ray oscilloscope tube 80 where it serves to provide a horizontal time base.

When the keyer relay 10 connects the transmitter 12 to transducers 14 and 16, it also serves in well known fashion to trigger a vertical sweep generator 70. The vertical sweep generator 70 generates a deflection voltage which is impressed upon the vertical deflection plates of oscilloscope tube 80. Vertical sweep generator 70 operates in well known fashion, to generate a vertical deflection voltage having a rate of increase determined by the velocity of the compressional wave propagated through water, the distance of the range desired and the distance calibration on the screen 82 of the cathode ray tube. The rate of vertical deflection voltage increase and therefore the range scanned, may be varied by means of vertical sweep generator control 72.

The calibration of the submarine object detecting and locating system described, is as follows: The transmitter 12 is tuned to a desired frequency, the tuning control 62 is also set at this frequency. An object is placed at a known distance away from the transducers 14 and 16 and in the plane which is at right angles to, and bisects the line between coplanar transducers 14 and 16. Echoes received by transducers 14 and 16 from the object will then cause them to generate electrical waves which are in phase. These generated waves from transducers 14 and 16 are respectively coupled to the right receiving channel and the left receiving channel wherein they are translated as described above. The translated waves are then combined in phase sensitive detector 52. The resultant 400 cycle pips are impressed upon the intensity grid of cathode ray oscilloscope tube 80. The power supply of oscilloscope tube 80 is not shown, being well known to the art. Oscilloscope tube 80 is biased in well known fashion, so that it will only give an indication on its screen 82 when a signal pip is received on its intensity grid from the phase sensitive detector 52, which causes a "blob" of light to appear on the cathode ray oscilloscope tube screen 82.

The phase shift network control 66 is then manipulated until the "blob" of light on the cathode ray tube screen 82 is on a vertical line 84 bisecting the cathode ray tube screen 82. Moving the object toward or away from the transducers 14 and 16 in the plane in which the object is equidistant from the transducers causes the "blob" of light to move up or down along the vertical line 84 since the distance from the bottom of cathode ray screen 86 determines the distance of the object from the transducers 14 and 16, and the object is being moved within the region where transducers 14 and 16 generate signals which are in phase. Phase shift control 66 having thus once been set needs no longer be manipulated. If the object is subsequently moved to the right or to the left of the plane in which it is equidistant from the transducers 14 and 16, the "blob" of light will be displaced to the right or left of the vertical line 84 an amount corresponding to the distance from the said equidistant plane. The vertical height of the "blob" will correspond to the distance from the transducers. The screen may thus be calibrated mechanically in azimuth and in distance so that the position of the "blob" of light on the screen directly determines the distance and azimuth of an object.

A listening receiver 74 is shown connected between the screen grids of the tubes 18 and 36. The listening receiver is used only when the transducers 14, 16 are left connected to the right and left receiving channels and is for the purpose of detecting noise from ship's propellers and the like which lie in the frequency spectrum from 19 kc. to 27 kc.

Shrown above, therefore, is a right receiving channel and a left receiving channel being used in a submarine pulse-echo object detecting and locating system for the purpose of isolating signals received by two coplanar transducers and maintaining the phase relationship of these signals while translating them to a form in which their phase difference is readily detected and utilized. Also shown above is the utilization of a common frequency modulated oscillator to provide heterodyne frequencies for two receiving channels and how a 400 cycle modulating oscillator in view of its use herein affects both receiving channels equally and thus prevents the establishment of erroneous phase relationships, which is further assured by the use of the modulating frequency as the synchronizing voltage of the horizontal sweep of the oscilloscope tube.

While a dual channel system has been shown and described as being used with a submarine pulse echo object detecting and locating system, it will be apparent to one skilled in the art that it is by no means limited to the particular organization shown and described. This dual channel system may be used with other object detecting and locating systems and at frequencies other than those used by way of example herein. It may be used with microphones or antennas as the receivers. More than two coplanar receivers may be used having their respective channels supplied with local oscillations from a single frequency modulated oscillator. Their respective phase differences may then be detected and utilized for providing additional information such as angle of elevation or a directional sense. Many other modifications may be made by one skilled in the art without departing from the spirit and scope of the invention.

What is claimed is:

1. In a submarine pulse echo object detecting and locating system having two coplanar transducers and means to display the azimuth of an object as a function of the phase difference in signals generated by said two coplanar transducers in response to received pulse echoes, a tunable dual channel system for isolating and maintaining the phase difference of signals generated by each of said transducers comprising a first radio frequency amplifier tube having a tunable grid circuit coupled to derive an output from a first one of said two transducers, a second radio frequency amplifier tube having a tunable grid circuit coupled to derive an output from a second one of said two transducers, first and second mixer tubes having their inputs respectively coupled to derive an output from said first and second radio frequency amplifier tubes, a frequency modulated oscillator having a tunable center carrier frequency and a carrier deviation of twice the modulating frequency, a reference phase oscillator modulating said frequency modulated oscillator, the output from said frequency modulated oscillator being impressed upon the inputs of said first and second mixer tubes, a first intermediate frequency amplifier tube and a second intermediate frequency amplifier tube respectively coupled to derive an output from said first and second mixers, a first crystal filter coupled to said first intermediate amplifier tube output, said first crystal filter being tuned to the difference frequency between the frequency of the sum of said frequency modulated oscillator center carrier frequency and said modulating frequency and the frequency of said output derived by said first radio frequency amplifier tube, a second crystal filter coupled to said second intermediate frequency amplifier tube output, said second crystal filter being tuned to the difference frequency between said frequency modulated oscillator center carrier frequency and the frequency of said output derived by said second radio frequency amplifier tube, and means to simultaneously tune the tunable grid circuits of said first and second radio amplifier tubes and said frequency modulated oscillator tunable center carrier frequency.

2. In a submarine object detecting and locating system having two coplanar receivers and means to display the azimuth of an object as a function of the phase difference of signals generated by said two coplanar receivers in response to a signal from an object, a system for maintaining the phase relationship of the signals generated by said receivers and obtaining an oscillation having a reference phase comprising a first amplifier and a second amplifier respectively coupled to derive an output from each of said two coplanar receivers, a first mixer and a second mixer respectively coupled to derive an output from said first and second amplifiers, a frequency modulated oscillator having a carrier deviation of twice the modulation frequency, a modulating oscillator modulating said frequency modulated oscillator, said frequency modulated oscillator output being impressed upon said first and second mixers, a first intermediate frequency amplifier and a second intermediate frequency amplifier respectively coupled to derive an output from said first and second mixers, means to tune said first intermediate frequency amplifier to the difference of the frequency of the sum of said frequency modulated oscillator center carrier frequency and said modulating frequency and the frequency of the receiver generated signal coupled to said first amplifier, and means to tune said second intermediate frequency amplifier to the difference frequency of said frequency modulated oscillator center carrier frequency and the frequency of the receiver generated signal coupled to said second amplifier, whereby the output of said modulating oscillator provides a reference phase for the phase difference of said generated signals.

3. In a submarine object detecting and locating system having two coplanar receivers and means to display the azimuth of an object as a function of the phase difference in signals generated by said receivers in response to signals from an object, a right receiving channel and a left receiving channel between said coplanar receivers and said display means each channel comprising a tunable radio frequency stage, a mixer stage and a tuned intermediate stage, a modulating oscillator, a frequency modulated oscillator modulated by said modulating oscillator, said frequency modulated oscillator providing local oscillations for the mixer stage of each of said channels, means to tune the intermediate frequency stages of said channels so that their frequency difference equals said modulating oscillator frequency whereby said modulating oscillator frequency provides a stable reference phase, means to generate a time base voltage responsive to said modulating oscillator frequency and means to apply said time base voltage to said display means.

References Cited in the file of this patent

UNITED STATES PATENTS

| | | |
|---|---|---|
| 2,166,991 | Guanella | July 25, 1939 |
| 2,408,395 | Hays | Oct. 1, 1946 |
| 2,420,439 | Morrison | May 13, 1947 |
| 2,461,364 | Zappacosta | Feb. 8, 1949 |
| 2,467,368 | Batchelder | Apr. 19, 1949 |